United States Patent [19]
Skala

[11] 3,756,720
[45] Sept. 4, 1973

[54] PORTABLE PHOTOGRAPHIC ATMOSPHERIC PARTICLE DETECTOR

[75] Inventor: George F. Skala, Scotia, N.Y.

[73] Assignee: Environment/One Corporation, Schenectady, N.Y.

[22] Filed: Jan. 27, 1972

[21] Appl. No.: 221,225

[52] U.S. Cl. .................................. 356/37, 356/103
[51] Int. Cl. ........................ G01n 1/00, G01n 21/00
[58] Field of Search ....................... 356/37, 103, 76, 356/246

[56] References Cited
UNITED STATES PATENTS
3,671,128   6/1972   Radke et al. ........................ 356/37
2,756,716   7/1956   Petrossian .......................... 356/246
2,062,929   12/1936   Powers .............................. 356/246

OTHER PUBLICATIONS
"Cloud Chamber for Counting Nuclei in Aerosols" Saunders; Rev. of Sci. Inst.; Vol. 27, No. 5; May 1956, pg. 273-277.
Portable Survey Spectrograph; Exton et al.; Rev. of Sci. Inst.; Vol. 35, No. 10, Oct. 1964; pg. 1370.

*Primary Examiner*—Ronald L. Wibert
*Assistant Examiner*—V. P. McGraw
*Attorney*—Charles W. Helzer

[57] ABSTRACT

A compact, portable photographic atmospheric particle detector that is relatively independent of operator technique and can be operated rapidly and easily in the field for use in field aerosol measurements in remote areas where concentrations of less than 1,000 particles per cubic centimeter are expected to be encountered. The detector includes a camera viewing a precise measurement illuminated volume of known dimension within an expansion type condensation chamber for photographically recording pictures of the cloud of liquid droplets produced about atmospheric particles as centers of condensation during a measurement cycle.

8 Claims, 8 Drawing Figures

PORTABLE PHOTOGRAPHIC ATMOSPHERIC PARTICLE DETECTOR

BACKGROUND OF THE INVENTION

1. Field of Invention

This invention relates to a portable photographic atmospheric particle detector.

More specifically, the invention relates to a portable photographic atmospheric particle detector which provides a recording camera viewing a precise measurement illuminated volume within a condensation chamber of the expansion type for photographically recording images of clouds of water droplets formed in the condensation chamber while performing a measurement.

2. Prior Art Problem

There are a number of known atmospheric particle detectors available to the industry for use in air pollution studies. One such instrument, for example, is described in U. S. Pat. No. 3,632,210 issued Jan. 4, 1972, to Theodore A. Rich for a "Variable Rate, Continuous Flow Condensation Nuclei Meter Having Adjustable Expansion Period and Improved Gain." The results obtained with instruments of this type have been good where they are used to measure continentally contaminated air containing aerosol particle concentrations of the order of $10^3$ or $10^5$ particles per cubic centimeter. However, where more dilute concentrations of the order of $10^2$ or $10^3$ particles per cubic centimeter are encountered, as is often the case in off-shore maritime air, difficulty has been experienced with resolving concentrations to better than plus or minus 100 particles per cubic centimeter with instruments of this known type in the range of 200 to 1,000 particles per cubic centimeter concentrations or less. The known Aitken and Scholz type counters which are of the type requiring visual observation and counting of the individual water cloud droplets by an operator of these instruments, appear to provide superior results where these low concentrations of less than 1,000 particles per cubic centimeter, are encountered.

The Aitken and Scholz type counters require that the individual drops be counted and the concentration geometrically calculated. This counting procedure becomes complicated at low concentrations and the counting error becomes progressively larger with decreasing concentration, requiring a large number of counts to be made in order to measure accurately the existing aerosol particle concentration in a given measurement situation. Such repeated measurements will provide acceptable results if the observer or user of the instruments is a fully qualified particle measurement observer, and only the approximate number concentration of aerosol particles is desired. However, if the observer has other observations to perform and/or accurate aerosol particle counts are desired, then the known Aiken and Scholz counters become too cumbersome for practical use. Since it is necessary to obtain maximum accuracy in the aerosol particle count if sizing information and techniques are involved in the measurement, the use of such known instruments in attempting such measurement becomes burdensome. Additionally, the dilution systems required by the known Aitken and Scholz counters and the manual methods for forming the Aiken counter expansion (to induce condensation about the aerosol particles as centers), lead to uncertainties where a large number of instruments are operated by many different individuals. To overcome these problems, the present invention was devised.

SUMMARY OF INVENTION

It is therefore a primary object of the present invention to provide a new and improved portable photographic atmospheric particle detector that allows automatic operation of the expansion and measurement sequence to minimize differences in operator techniques. Photographic recording is provided with capability for multiple expansions and exposures on a single light sensitive film sheet to minimize random counting errors. In preferred embodimetns of the invention, self-processing film of the Polariod Land type is used in recording in order to provide rapid access to data. This also reduces coding and bookkeeping errors by allowing the observer taking a measurement to record location, date, time and number of measurement cycles performed directly on an exposed frame of the film, immediately upon performing the measurement.

A feature of the invention is the provision of a precise, thin, measurement illuminated volume within the expansion chamber of the instrument which allows a purely geometric calibration of the instrument merely by measuring the dimensions of the light being transmitted through the thin, measurement illuminated volume. Additionally, battery operation of all circuits, small size, and lightweight together with low cost facilitate remote operation and permits a moderately dense network of observers to be established in performing air pollution studies.

BRIEF DESCRIPTION OF DRAWINGS

These and other objects, features and many of the attendant advantages of this invention will be appreciated more readily as the same becomes better understood by reference to the following detailed description, when considered in connection with the accompanying drawings, wherein like parts in each of the several figures are identified by the same reference character, and wherein:

FIGS. 2B and 2C illustrate the details of construction of a light trap included in the expansion chamber of FIGS. 2 and 2A.

DETAILED DESCRIPTION OF PREFERRED EMBODIMENT

Figures 1, 1A, 1B:
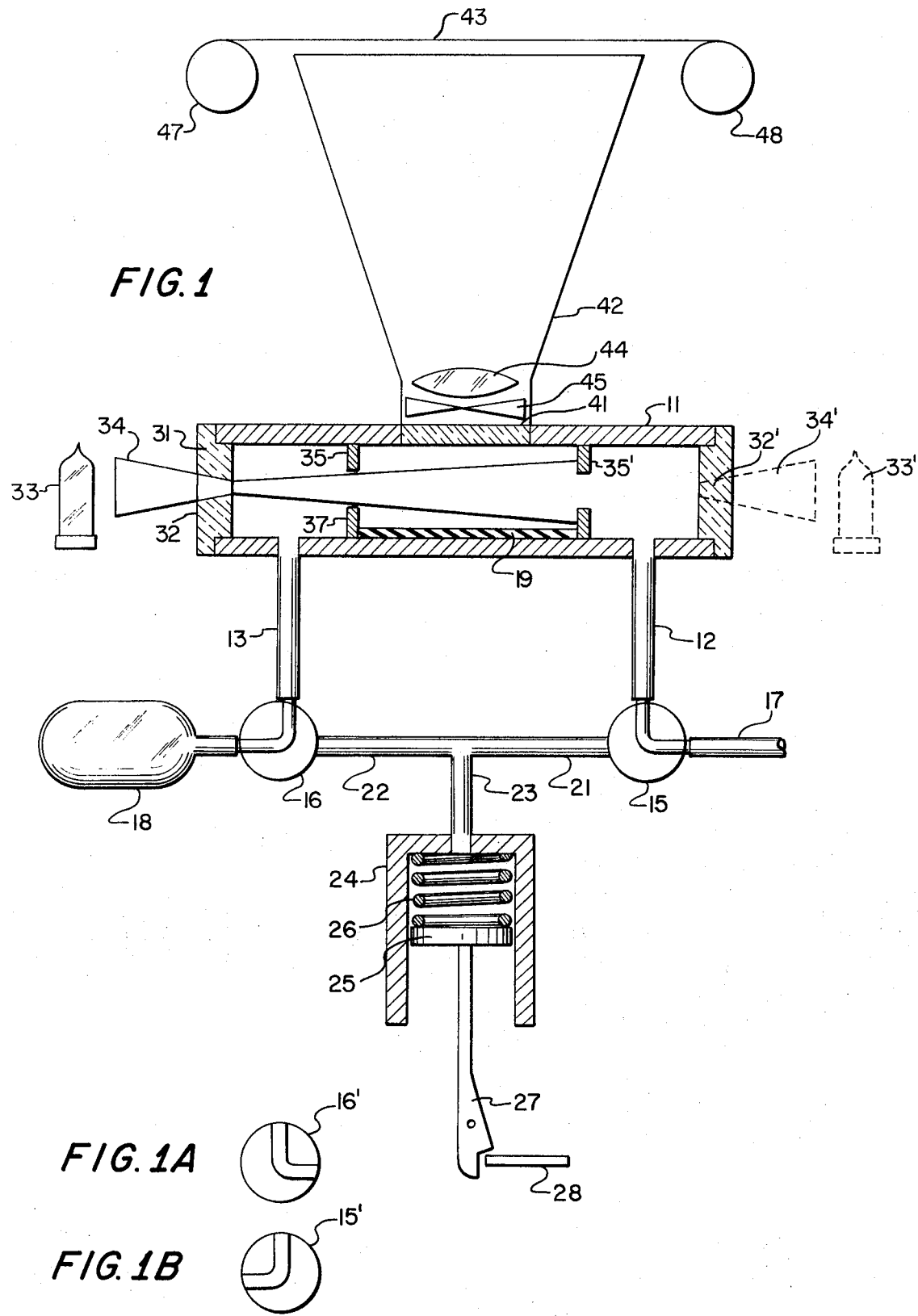
FIG. 1 is a functional, schematic diagram of a new and improved, portable, photographic atmospheric particle detector constructed in accordance with the invention.
FIGS. 1A and 1B are partial schematic views of the two-way valves used in the particle detector of FIG. 1 showing the valves set in a second condition preparatory to taking a measurement.

FIG. 1 of the drawings is a functional schematic diagram of an overall portable photographic atmospheric particle detector constructed in accordance with the invention. In FIG. 1, an expansion chamber is shown at 11 which has a generally, elongated cylindrical or rectangular form and is fabricated from aluminum or some other lightweight material such as an opaque insulating material to form an air tight interior chamber. Means defining inlet and outlet passageways are shown at 12 and 13 for introducing into and withdrawing from the interior of the expansion chamber 11 specimens of atmospheres to be monitored for atmospheric particles during each measurement cycle. Valving means shown at 15 and 16 are included in the respective inlet and outlet passageways 12 and 13. The inlet and outlet passageways 12 and 13 may comprise copper or plastic conduit of a standard commercially available type and the valving means 15 and 16 may comprise standard two-way valves for connecting the inlet pasageway 12 to a sample intake conduit 17, and for connecting the outlet passageway 13 to a conventional, commercially available, bulb-type hand pump for causing a flow of a sample atmosphere to take place in the expansion chamber with the two-way valves 15 and 16 adjusted in a first setting as shown in FIG. 1. The bulb-type hand pump 18 has built-in intake and discharge check valves for producing a flow of sample gaseous atmospheres through the expansion chamber 11 upon being squeezed and released alternately. Upon a sample gaseous atmosphere being introduced into the expansion chamber 11 in this manner, it will be humidified by a water moistened blotter material shown at 19 which is used to line the interior surface of the expansion chamber 11 and is properly wetted prior to making measurements with the instrument.

After having introduced a sample or spcimen of a gaseous atmosphere to be monitored for atmospheric particles into the interior of the expansion chamber 11 in the above-described manner, the two-way valves 15 and 16 are each switched to an alternate second setting to thereby selectively trap a specimen of humidified gaseous atmosphere to be monitored within the expansion chamber. The alternate second settings of the valves 15 and 16 are shown at 15' in FIG. 1A and 16' in FIG. 1B. Switching of the valves 15 and 16 to the second alternate setting, or back to the first setting can be accomplished manually. However, it is believed obvious that if the photographic atmospheric particle detector is to be adapted for automatic operation, such switching of the setting of the valves 15 and 16 can be accomplished automatically. With the valves 15 and 16 switched to the second alternate setting shown in FIGS. 1A and 1B, both inlet and outlet passageways 12 and 13 will be connected through conduits 21 and 22 to the intake 23 of a mechanically actuated expanable volume 24. The mechanically actuated expandable volume 24 may comprise a spring actuated sliding piston 25 riding in a cylinder and cocked against a coil spring 26 by means of a lever 27 and stop 28. Alternatatively, a mechanically actuated bellows mechanism could be employed such as the commercially available Bellofram manufactured and sold by the Bellofram Corporation. With this arrangement, the piston 25 or corresponding bellows can be compressed thereby cocking the coil spring 26, and latched in the compressed position by locking lever 27 in back of stop 28. When it is desired to perform an expansion of the space within the expansion chamber 11, stop 28 is released allowing the coil spring 26 to drive piston 25 outwardly thereby producing a sharp reduction in pressure (expansion) of the space within the expansion chamber 11. The arrangement is such that with the piston 25 (or corresponding bellows) in the fully expanded position, the following relation is obtained: P (original) = 1.21 P (final). As is well known in the art, this sudden decrease in the pressure within the expansion chamber, brings about a supersaturation of the air within the expansion chamber causing water droplets to form about the particles entrained in the air as condensation nuclei.

In order to obtain a count or measurement of the number of water droplets formed in the cloud of water droplets within expansion chamber 11 during the expansion interval as described above, one end 31 of the expansion chamber has a window 32 formed in it which is disposed opposite an electronic flash bulb 33. If desired, a fiber optic light coupling device shown at 34 may be disposed between the electronic flash bulb 33 and the window 32 so as to transmit substantially all of the light from the flash bulb through the window 32. Light passing through the window 32 is collimated by a first collimating aperture shown at 35 mounted within the expansion chamber 11 and disposed between the flash lamp 33 and a precise measurement illuminated volume indicated in phantom at 36, and defined within the interior of expansion chamber 11 by the collimated light beam passing through the aperture 37 in aperture plate 35. If desired, a second light source 33', fiber optic light coupling device 34', window 32' and second apertured plate 35' may be provided for the opposite end of the condensation chamber 11 in order to insure adequate illumination of the precise measurement illuminated volume 36. However, it has been established that one light source and collimating aperture 37 is adequate to provide sufficient illumination. Hence, in preferred embodiments of the invention, only a single light source and collimating apertured plate 35 is employed. It will be seen by this arrangement, that the light from the electronic flash bulb 33 will be collimated by the aperture 37 in apertured plate 35 into a ribbon-shaped beam of light that defines the precise measurement illuminated volume 36 of known dimension within the expansion chamber 11.

Positioned directly over the location of the precise measurement illuminated volume 36 is a window 41 formed in expansion chamber 11. Supported over window 41 is a light tight housing 42 that may comprise the outer housing of a camera whose film plane is indicated at 43 and further including a lens assembly 44 and shutter mechanism 45. The camera 42 may comrpise any known camera such as a 35 mm. camera suitable for use with an electronic flash as a light source. However, preferably the camera 42 comprises a Polaroid Land camera with a modified shutter and lens. The lens 44 is a short focal point lens that includes the precise measurement illuminated volume 36 within its field of focus so that all of the water droplets that are formed within expansion chamber 11 within the precise measurement illuminated volume 36 will be in focus and properly imaged on the film plane 43 of the camera. Additionally, the shutter mechanism 45 is disposed between the lens 44 and the window 41, and is designed so that it can be set to an open condition and thereafter left open at the operator's will until closed.

Figure 2A:
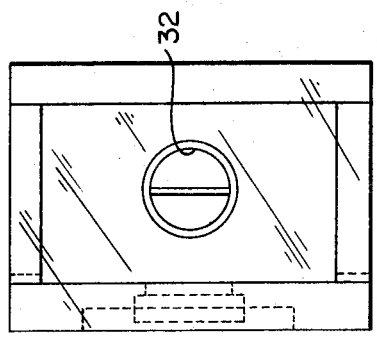
FIGS. 2, 2A, 2B and 2C illustrate a top plan view and a side view of the expansion chamber of the apparatus wherein condensation of water about particles to be measured as centers of condensation, is performed.
Figure 2:
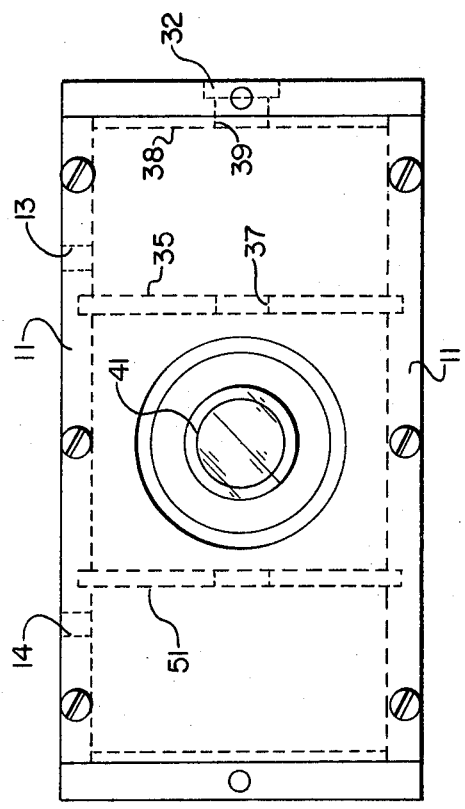

FIGS. 2 and 2A of the drawings illustrate certain details of construction of the expansion chamber 11. In FIG. 2, it will be seen that the window 41 comprises preferably a circular-shaped window centrally disposed over the top of the expansion chamber 11 and on the same center line as the window 32 in the end of the expansion chamber. The window 41 may have a diameter of the order of 19 mm. and the end window 32 may be about 13 mm. in diameter. The expansion chamber may have a size of the order of 1 and 1½ inches in width by 4 inches in length and three-fourths inch in depth. The apertured plate 35 is disposed about 1¼ inches from the end of the expansion chamber in which window 32 is formed and the aperture 37 in apertured plate 35 may constitute a slot of the order of 0.02 inches by 0.4 inches in dimensions. For best results, it is desirable to include a second apertured plate 38 having a corresponding aperture 39 mounted immediately adjacent to the end wall of expansion chamber 11 in which the window 32 is formed. With this construction, a very thin ribbon of light will be transmitted through the two apertures 39 and 37 across the central interior of the condensation chamber to define the precise measurement illuminated volume 36 within the interior of the condensation chamber.

Figure 2B:
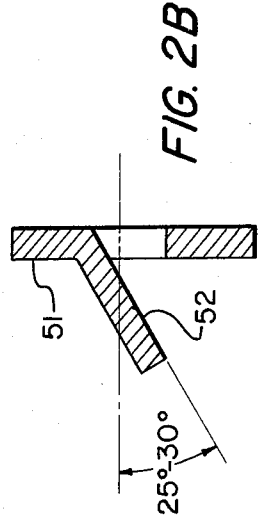
Figure 2C:
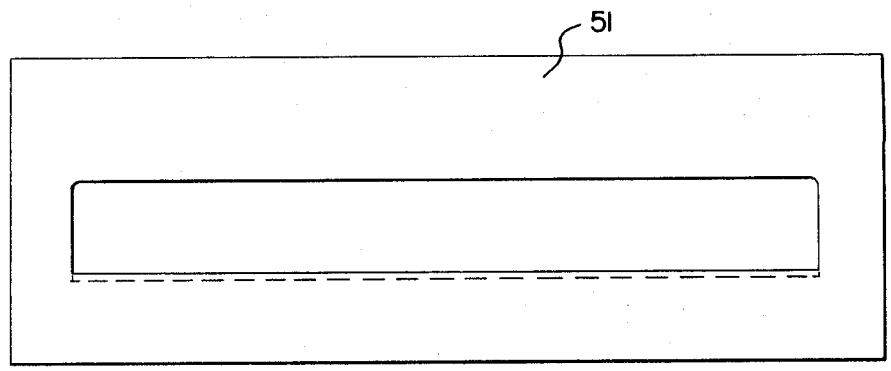

In order to cut down on undesired lighting effects due to specular reflection of the light from water droplets formed in those portions of the interior of the condensation chamber 11 that are not within the precise measurement illuminated volume 36 defined by the collimated ribbon of light, a light trap shown at 51 is provided. The light trap may comprise an apertured plate whose construction is best shown in FIGS. 2B and 2C of the drawings, and which has a angular flap or diverter plate portion shown at 52 in FIG. 2B positioned substantially on the center line of the collimated ribbon of light. With this arrangement, the aperture in plate 51 will allow adequate flow to take place through the interior of expansion chamber 11 through inlet and outlet pasageway connections 13 and 14, and yet will divert the collimated light ribbon downwardly and substantially reduce or prevent entirely adverse effects upon the measurement due to specular reflection from light droplets not within the defined precise measurement volume 36.

Figure 3:
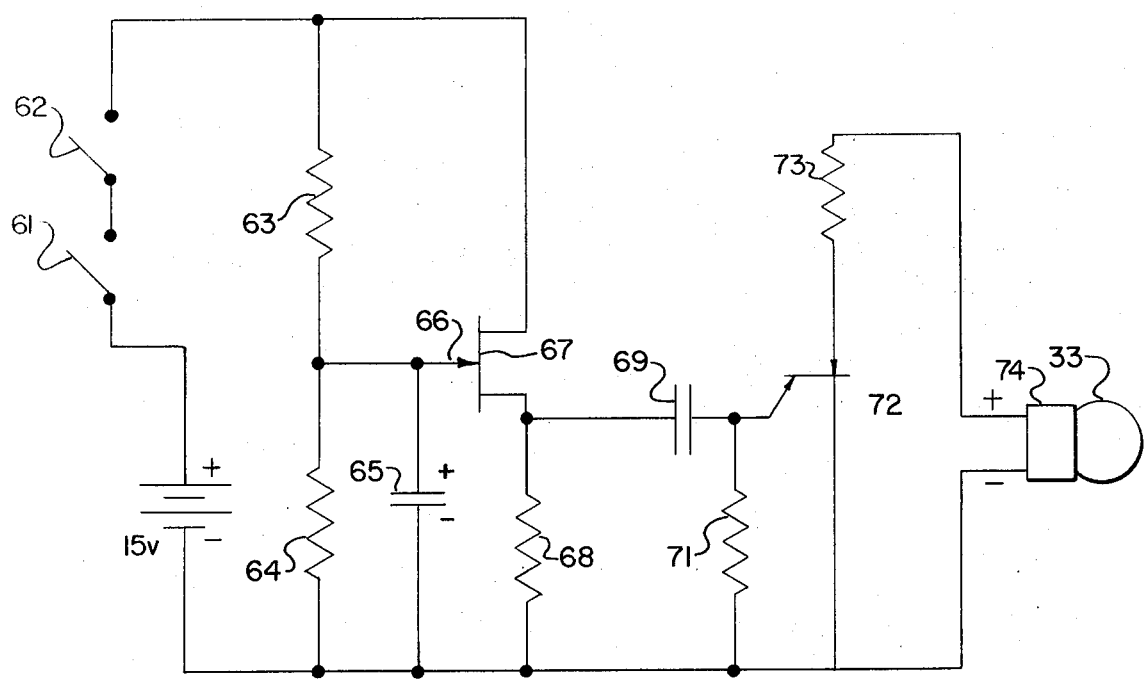
FIG. 3 is a schematic circuit diagram of the electric circuit employed to coordinate flashing of a flash lamp with the production of and expansion within the expansion chamber of the instrument.

FIG. 3 of the drawings is a schematic circuit diagram of the electrical circuit employed to operate the flash lamp 33 in a manner such that the lamp is energized and produces a light flash substantially in synchronism with the production of an expansion (and hence with the production of water droplets within expansion chamber 11 about the atmospheric particles as centers of condensation). As shown in FIG. 3, a 15 volt battery is connected in series circuit relationship through a first switch 61 and a second switch 62 across a pair of voltage deviding resistors 63 and 64. The first switch 61 is mechanically connected to and actuated by the shutter mechanism 45 of camera 42. When the shutter 45 of camera 42 is opened, the switch 61 will be closed and when the shutter 45 is closed so as to prevent images from being projected onto the film plan 43 by lens 45, the switch 61 will be opened. Thus, it will be appreciated that the switch 61 locks out and prevents operation of the flash lamp 33 under conditions where the shutter mechanism 45 has not been properly conditioned to allow a photographic image to be recorded on the film plate 43. The switch 62 is mechanically connected to and actuated by the spring actuated expandable volume 24 whether it be in the form of a spring actuated piston and cylinder, a spring actuated bellows (Bellofram) or other similar expandable volume device. Switch 62 is so connected that upon the spring actuated piston 25 being driven outwardly by the coil spring 26, switch 62 is closed thereby connecting the 15 volt battery across voltage dividing resistor 63 and 64 assuming that shutter switch 61 has been closed as described above.

An intermediate tap-point of the voltage dividing resistor 63 and 64 is connected across a charging capacitor 65 and to the emitter electrode 66 of a unijunction transistor 67 having one of its base electrodes connected to the upper end of the voltage dividing resistor 63 and 64 and having its remaining base connected through a load resistor 68 back to the negative terminal of the 15 volt battery. Load resistor 68 is coupled through a coupling capacitor 69 and resistor 71 to the control gate of a small silicon control rectifier 72. Silicon control rectifier 72 is connected in circuit relationship with the excitation circuit 74, the flash lamp 33 through a small dropping resistor 73. Circuit 74 has its own built-in power supply for enabling SCR 72. Hence, upon the application of a turn-on signal to the control gate of SCR 72, it will operate excitation circuit 74 and energize flash lamp 33. The time of the turn-on signal is syncrhonized with the closing of switch 62, and occurs after a predetermined delay set by the time constant of resistor 63 and capacitor 65 in order that the water droplets have an opportunity to grow to an observable size prior to initiation of the light flash.

Having described the construction of a preferred embodiment of the invention, its operation is as follows. With the valves 15 and 16 in the opened position shown in solid lines in FIG. 1, the interior of the cloud chamber 11 is flushed by operating the bulb-type hand pump 18 several times in the normal pumping action. Shutter 45 is opened hence closing switch 61. The valves 16 and 15 are then rotated to their second setting as shown in FIGS. 1A & 1B whereby the interior of the expansion cloud chamber 11 is connected to spring actuated expandable volume 24 with the volume in its cocked or compressed position as shown in FIG. 1. The spring actuated expandable volume 24 is then released and the interior of the cloud chamber 11 is allowed to reach an equilibrium temperature and humidity condition. It should be noted that in reaching this condition, water droplets will be formed about atmospheric particles entrained in air sample within the expansion chamber, and this will require some finite time period. This time period is properly correlated to the time constant of the resistor charging capacitor network comprised by resistor 63 and capacitor 65 in FIG. 3 of the drawings. By properly proportioning the time constant of this network, the unijunction transistor 67 will not be rendered conductive until such time that the water droplets within the expansion chamber have been allowed to reach their maximum obtainable size. This time constant is on the order of 400 milliseconds after initiation of the expansion. Following this 400 millisecond time delay, the flash lamp 33 will be flashed by the turn-on of the SCR 72 and will illuminate the precise measurement illuminated volume 36 within expansion chamber 11. Since the shutter mechanism 45 has been opened prior to initiation of the measurement cycle, flashing of the flash lamp and illumination of the sensitive volume 36 will result in recording images of the water droplets produced within this precise measurement illuminated volume on the film or image plane 43. For improved accuracy, it is possible to record several images of the water droplets thus formed on the film plane and thereafter average out the results of the count thus obtained. If no such averaging of a number of exposures on a single film plane is desired or required, the shutter mechanism can be closed thereby opening switch 61 of FIG. 3 and conditioning the circuit for a new measurement cycle. Thereafter, a new area of the film strip must be rotated into place over the camera by operation of the rolls shown at 47 and 48 in the normal manner. After thus setting the camera to expose a new area of the film plane, the shutter mechanism 45 can be opened and the entire cycle of operation described above repeated in performing as many measurements at a given site or location as are desired.

From the foregoing description, it will be appreciated that the instrument comprises an absolute particle counter of the Aitken type. However, its calibration depends only on the precise measurement of the ratio of the volume of the precise measurement illuminated volume or zone 36 to the area of the photographic film plane being exposed, and the verification that the expansion ratio P (original)= 1.21 P (final), is attained within the expansion chamber upon actuation of the expandable volume 24. The spring loaded expandable volume 24 is designed to achieve this required expansion ratio (and hence assure supersaturation within the expansion chamber), assures repeatability, and is easily operated by relatively unskilled personnel. With respect to the photographic images thus recorded, the droplet images formed on the recording film are not sharp due to the simple lens used, and the amount of magnification available. This feature is not too important in the reduction and use of the data, however, as the number of images formed is governed primarily by the volume illuminated, and not by the depth of field of the lens. The images are of good contrast and are quite easy to see and to count under low power magnification. However, small emulsion separations, and sedimenting dust also produce drop like spots on the recording film. To resolve these ambiquities, a low power stereo microscope can be employed counting the water droplet images thereby allowing an analyst to uniquely separate drop images from film defects and sedimentation or dust particles. The low aerosol particle concentrations which the instrument was designed to measure results in records showing only one or two droplet images per square centimeter when a single expansion and exposure is made on a single recording film sheet. Since the counting error can be larger when only a few images are counted, it is desirable to increase the number of images obtained in a given measurement. This is most easily accomplished by operating the instrument through several flush-expand-photograph cycles on a single frame of film, thereby increasing the number of images to be counted, and substantially reducing the counting error. This, however, requires that the camera-cloud chamber interface be exceptionally light tight to prevent fogging of the film by stray light while the shutter 45 is open. A simple sponge rubber gasket mounted at this interface achieves suffcient sealing to allow as many as ten exposures on a single photographic plane without loss of contrast, even in bright sunlight. For these reasons, it is recommended that as many as three expansions be used when a concentration in the range of 300 to 1,000 particles per cubic centimeter is expected. When concentrations less than 300 particles per cubic centimer are encountered, at least five repetitive expansions on a single photographic film plane will usually provide sufficient drop images to obtain an accurate count. As many as ten exposures can be made on a single film sheet, without fogging the background, in those measurement situations where less than fifty particle per cubic centimeter are present.

From the foregoing description, it will be appreciated that the invention provides a new and improved portable photographic atmospheric particle detector which provides for automatic operation of the expansion sequence and which minimizes differences in operator technique. The instrument allows photographic recording with a capability for multiple expansions and exposures on a single film sheet in order to minimize random counting error. Preferably, self-processing film of the Polaroid Land type is used in recording in order to provide rapid access to data and also to reduce coding and bookkeeping errors by allowing observer to the observer location, date, time and number or expansions directly on the film frame immediately upon performing the measurement. Absolute counting of a thin, precise measurement illuminated volume is provided which allows for a purely geometric calibration of the instrument by measuring the dimensions of the light beam. Additionally, battery operation of all circuits, small size and lightweight facilitate remote site operation and thereby permit use by a large number of observers forming a moderately dense monitoring network at relatively low cost.

Having described one form of a portable photographic atmospheric particle detector according to the invention, it is believed obvious that other modifications, variations and embodiments of the invention will be suggested to those skilled in the art in the light of the above teachings. It is therefore to be understood that any such modifications, variations and embodiments are considered to be within the scope of the present invention as defined by the attached claims.

What is claimed is:

1. A portable photographic atmospheric particle detector including a housing defining an expansion chamber, conduit means defining inlet and outlet passageways to opposite ends of said expansion chamber for introducing into and withdrawing from said expansion chamber specimens of an atmosphere to be monitored for atmospheric particles during each measurement cycle, manually operated inlet and outlet valve means for connecting the passageways to a manually operated source of low pressure and to an atmosphere to be monitored to provide for differential flow of a sample gaseous atmosphere through the expansion chamber with the inlet and outlet valving means in a first condition, means for humidifying the sample gaseous atmosphere, a manually operated mechanically actuable expandable volume, conduit means for selectively connecting the humidified sample gaseous atmosphere trapped in the expansion chamber to the manually operated expandable volume for at least a short time duration expansion interval with the inlet and outlet valving means in a second condition, said manually operated expandable volume upon actuation by an operator of the detector suddenly decreasing the pressure in the expansion chamber during the expansion interval whereby a cloud of small liquid droplets is formed in the expansion chamber on the atmospheric particles as centers of condensation upon the occurrence of the sudden decrease in pressure, flash lamp means for illuminating the interior of the expansion chamber, light collimating means interposed in the light path intermediate the flash lamp means and the expansion chamber for collimating the light into a beam for illuminating a precise measurement illuminated volume of known dimensions within the expansion chamber, camera means having a lens viewing the precise measurement illuminated volume within its field of focus through a window in the expansion chamber for photographically recording pictures of the cloud of liquid droplets produced within the precise measurement illuminated volume during the expansion interval, and electric circuit means connected to said flash lamp means for energizing the same, said electric circuit means including switch means mechanically interconnected with and actuable by said mechanically actuated expandable volume whereby operation of said flash lamp means is synchronized with the operation of said expandable volume.

2. A portable photographic atmospheric particle detector according to claim 1 wherein said valving means in said inlet and outlet passageways in said one condition connects a sample intake through the inlet valve to the expansion chamber and connects the expansion chamber through the outlet valve to said expandable volume, and said valving means in said second condition connects both the inlet and outlet ends of the expansion chamber to the mechanically actuated expandable volume to condition the same for the expansion and for minimizing turbulence within the expansion chamber during the expansion interval.

3. A portable photographic atmospheric particle detector according to claim 2 wherein the particle detector includes a bulb-type hand pump for providing the source of low pressure to cause the flow of sample atmospheres through the expansion chamber with the valving means set in the first condition to open the inlet and outlet passageways, said bulb-type hand pump having built-in intake and discharge check valves for producing a flow of sample gaseous atmosphere through the detector upon being squeezed and released alternately, and wherein said means for humidifying the sample gaseous atmosphere comprises a water moistened blotter disposed in the expansion chamber.

4. A portable photographic atmospheric particle detector according to claim 1 wherein said expansion chamber is elongated in nature, and flash lamp means are disposed at each of the ends thereof for illuminating the interior of the expansion chamber through suitable window portions at each end of the expansion chamber.

5. A portable photographic atmospheric particle detector according to claim 1 wherein the camera means comprises a camera of the self processing type mounted on the expansion chamber by means of a light tight housing and viewing the precise measurement illuminated volume within the interior of the expansion chamber through a window formed in the side of the expansion chamber, said camera having a shutter mechanism and lens modified to include the precise measurement illuminated volume within the depth of field of the lens whereby all droplets formed during the expansion interval within the precise measurement illuminated volume will be in focus and readings can be obtained substantially at the same time as making a measurement.

6. A portable photographic atmospheric particle detector according to claim 5 wherein said shutter mechanism is disposed between the window in the expansion chamber and the film plane of the camera, and said particle detector further includes means for locking out operation of said flash lamp means with said shutter mechanism in a closed condition.

7. A portable photographic atmospheric particle detector according to claim 1 further including light trap means disposed within the expansion chamber on the side of the precise measurement illuminated volume away from the light collimating means and the flash lamp means whereby undesired lighting effects produced in out-of-focus portions of the interior of the expansion chamber are minimized.

8. A portable photographic atmospheric particle detector according to claim 3 wherein the camera means comprises a camera of the self processing type mounted on the expansion chamber by means of a light tight housing and viewing the precise measurement illuminated volume within the interior of the expansion chamber through a window formed in the side of the expansion chamber, said camera having a shutter mechanism and lens modified to include the precise measurement illuminated volume within the depth of field of the lens whereby all of the droplets formed during the expansion interval within the precise measurement illuminated volume will be in focus and readings can be obtained substantially at the same time as making a measurement, said shutter mechanism being disposed between the window in the expansion chamber and the film plane of the camera, means for locking out operation of said flash lamp means with said shutter mechanism in a closed condition, and light trap means disposed within the expansion chamber on the side of the precise measurement illuminated volume away from the light collimating means and the flash lamp means whereby undesired lighting effects produced in the out-of-focus portions of the interior of the expansion chamber are minimized.

* * * * *